United States Patent
Ying et al.

(10) Patent No.: US 7,801,348 B2
(45) Date of Patent: Sep. 21, 2010

(54) METHOD OF AND SYSTEM FOR CLASSIFYING OBJECTS USING LOCAL DISTRIBUTIONS OF MULTI-ENERGY COMPUTED TOMOGRAPHY IMAGES

(75) Inventors: Zhengrong Ying, Wakefield, MA (US);
Ram Naidu, Newton, MA (US); Sergey Simanovsky, Brookline, MA (US);
Matthew Hirsch, Cambridge, MA (US);
Carl R. Crawford, Brookline, MA (US)

(73) Assignee: Analogic Corporation, Peabody, MA (US)

( * ) Notice: Subject to any disclaimer, the term of this patent is extended or adjusted under 35 U.S.C. 154(b) by 1021 days.

(21) Appl. No.: 11/183,471

(22) Filed: Jul. 18, 2005

(65) Prior Publication Data

US 2007/0014472 A1 Jan. 18, 2007

(51) Int. Cl.
*G06K 9/00* (2006.01)
(52) U.S. Cl. .................. 382/131; 382/132; 382/168
(58) Field of Classification Search ......... 382/128–134; 378/1–90
See application file for complete search history.

(56) References Cited

U.S. PATENT DOCUMENTS

| | | | | |
|---|---|---|---|---|
| 4,029,963 | A | 6/1977 | Alvarez et al. | 250/360 |
| 4,759,047 | A | 7/1988 | Donges et al. | 378/57 |
| 4,884,289 | A | 11/1989 | Glockmann et al. | 378/57 |
| 5,132,988 | A | 7/1992 | Fisher et al. | 375/11 |
| 5,132,998 | A | 7/1992 | Tsutsui et al. | 378/99 |
| 5,182,764 | A | 1/1993 | Peschmann et al. | 378/57 |
| 5,247,561 | A | 9/1993 | Kotowski | 378/87 |
| 5,295,202 | A * | 3/1994 | Steinkirchner et al. | 382/167 |
| 5,319,547 | A | 6/1994 | Krug et al. | 364/409 |

(Continued)

FOREIGN PATENT DOCUMENTS

DE 3150306 A1 12/1981

(Continued)

OTHER PUBLICATIONS

Alvarez, R. E., et al., "Energy-selective Reconstruction in X-ray Computerized Tomography", Phys. Med. Biol. 1976, Vo. 21, No. 5, 733-744.

(Continued)

*Primary Examiner*—Vu Le
*Assistant Examiner*—Alex Liew
(74) *Attorney, Agent, or Firm*—McDermott Will & Emery LLP

(57) ABSTRACT

A method of and a system for identifying objects using local distribution features from multi-energy CT images are provided. The multi-energy CT images include a CT image, which approximates density measurements of scanned objects, and a Z image, which approximates effective atomic number measurements of scanned objects. The local distribution features are first and second order statistics of the local distributions of the density and atomic number measurements of different portions of a segmented object. The local distributions are the magnitude images of the first order derivative of the CT image and the Z image. Each segmented object is also divided into different portions to provide geometrical information for discrimination. The method comprises pre-processing the CT and Z images, segmenting images into objects, computing local distributions of the CT and Z images, computing local distribution histograms, computing local distribution features from the said local distribution histograms, classifying objects based on the local distribution features.

50 Claims, 7 Drawing Sheets

U.S. PATENT DOCUMENTS

| | | | |
|---|---|---|---|
| 5,367,552 A * | 11/1994 | Peschmann | 378/57 |
| 5,473,657 A | 12/1995 | McKenna | 378/4 |
| 5,490,218 A | 2/1996 | Krug et al. | 382/100 |
| 5,633,948 A * | 5/1997 | Kegelmeyer, Jr. | 382/132 |
| 5,661,774 A | 8/1997 | Gordon et al. | 378/101 |
| 5,802,134 A | 9/1998 | Larson et al. | |
| 5,881,122 A | 3/1999 | Crawford et al. | |
| 5,887,047 A | 3/1999 | Bailey et al. | |
| 5,901,198 A | 5/1999 | Crawford et al. | |
| 5,909,477 A | 6/1999 | Crawford et al. | |
| 5,932,874 A | 8/1999 | Legg et al. | |
| 5,937,028 A | 8/1999 | Tybinkowski et al. | |
| 5,949,842 A * | 9/1999 | Schafer et al. | 378/4 |
| 5,970,113 A | 10/1999 | Crawford et al. | |
| 5,982,843 A | 11/1999 | Bailey et al. | |
| 5,982,844 A | 11/1999 | Tybinkowski et al. | |
| 6,026,143 A | 2/2000 | Simanovsky et al. | |
| 6,026,171 A * | 2/2000 | Hiraoglu et al. | 382/100 |
| 6,035,014 A | 3/2000 | Hiraoglu et al. | |
| 6,067,366 A | 5/2000 | Simanovsky et al. | |
| 6,075,871 A | 6/2000 | Simanovsky et al. | |
| 6,076,400 A | 6/2000 | Bechwati et al. | |
| 6,078,642 A | 6/2000 | Simanovsky et al. | |
| 6,091,795 A | 7/2000 | Schafer et al. | |
| 6,108,396 A | 8/2000 | Bechwati et al. | |
| 6,111,974 A | 8/2000 | Hiraoglu et al. | |
| 6,128,365 A | 10/2000 | Bechwati et al. | |
| 6,195,444 B1 | 2/2001 | Simanovsky et al. | |
| 6,256,404 B1 | 7/2001 | Gordon et al. | |
| 6,272,230 B1 | 8/2001 | Hiraoglu et al. | |
| 6,317,509 B1 | 11/2001 | Simanovsky et al. | |
| 6,345,113 B1 | 2/2002 | Crawford et al. | |
| 6,687,326 B1 | 2/2004 | Bechwati et al. | |
| 6,721,387 B1 | 4/2004 | Naidu et al. | |
| 6,748,043 B1 | 6/2004 | Dobbs | |
| 6,813,374 B1 | 11/2004 | Karimi et al. | |
| 2002/0028008 A1 * | 3/2002 | Fan et al. | 382/131 |
| 2003/0095692 A1 * | 5/2003 | Mundy et al. | 382/128 |
| 2005/0084063 A1 * | 4/2005 | Heismann et al. | 378/53 |
| 2005/0226486 A1 * | 10/2005 | Tsujii | 382/132 |
| 2005/0238232 A1 * | 10/2005 | Ying et al. | 382/170 |
| 2005/0259781 A1 | 11/2005 | Ying et al. | |
| 2005/0271293 A1 | 12/2005 | Ying et al. | |
| 2005/0276373 A1 | 12/2005 | Ying et al. | |
| 2005/0276468 A1 | 12/2005 | Ying et al. | |
| 2006/0002585 A1 | 1/2006 | Larson et al. | |
| 2006/0023844 A1 | 2/2006 | Naidu et al. | |
| 2006/0039599 A1 | 2/2006 | Deykoon et al. | |
| 2006/0072703 A1 | 4/2006 | Naidu et al. | |

FOREIGN PATENT DOCUMENTS

| | | |
|---|---|---|
| WO | WO 96/13017 | 5/1996 |

OTHER PUBLICATIONS

Lehmann, L. A., et al., "Generalized Image Combinations in Dual KVP Digital Radiography", Med. Phys. 8, 659-667 (1981).

Chuang, K., et al., "A Fast Dual-Energy Computational Method Using Isotransmission Lines and Tables", Med. Phys. 14, 186-192 (1987).

* cited by examiner

METHOD OF AND SYSTEM FOR CLASSIFYING OBJECTS USING LOCAL DISTRIBUTIONS OF MULTI-ENERGY COMPUTED TOMOGRAPHY IMAGES

RELATED APPLICATIONS

This patent application and/or patents are related to the following U.S. applications and/or issued U.S. patents, of the assignee as the present application, the contents of which are incorporated herein in their entirety by reference:

"Dual energy power supply," invented by Bernard M. Gordon, et al., U.S. Pat. No. 5,661,771, issued on Aug. 26, 1997;

"Nutating Slice CT Image Reconstruction Apparatus and Method," invented by Gregory L. Larson, et al., U.S. application Ser. No. 08/831,558, filed on Apr. 9, 1997, now U.S. Pat. No. 5,802,134, issued on Sep. 1, 1998;

"Computed Tomography Scanner Drive System and Bearing," invented by Andrew P. Tybinkowski, et al., U.S. application Ser. No. 08/948,930, filed on Oct. 10, 1997, now U.S. Pat. No. 5,982,844, issued on Nov. 9, 1999;

"Air Calibration Scan for Computed Tomography Scanner with Obstructing Objects," invented by David A. Schafer, et al., U.S. application Ser. No. 08/948,937, filed on Oct. 10, 1997, now U.S. Pat. No. 5,949,842, issued on Sep. 7, 1999;

"Computed Tomography Scanning Apparatus and Method With Temperature Compensation for Dark Current Offsets," invented by Christopher C. Ruth, et al., U.S. application Ser. No. 08/948,928, filed on Oct. 10, 1997, now U.S. Pat. No. 5,970,113, issued on Oct. 19, 1999;

"Computed Tomography Scanning Target Detection Using Non-Parallel Slices," invented by Christopher C. Ruth, et al., U.S. application Ser. No. 08/948,491, filed on Oct. 10, 1997, now U.S. Pat. No. 5,909,477, issued on Jun. 1, 1999;

"Computed Tomography Scanning Target Detection Using Target Surface Normals," invented by Christopher C. Ruth, et al., U.S. application Ser. No. 08/948,929, filed on Oct. 10, 1997, now U.S. Pat. No. 5,901,198, issued on May 4, 1999;

"Parallel Processing Architecture for Computed Tomography Scanning System Using Non-Parallel Slices," invented by Christopher C. Ruth, et al., U.S. application Ser. No. 08/948,697, filed on Oct. 10, 1997, U.S. Pat. No. 5,887,047, issued on Mar. 23, 1999;

"Computed Tomography Scanning Apparatus and Method For Generating Parallel Projections Using Non-Parallel Slice Data," invented by Christopher C. Ruth, et al., U.S. application Ser. No. 08/948,492, filed on Oct. 10, 1997, now U.S. Pat. No. 5,881,122, issued on Mar. 9, 1999;

"Computed Tomography Scanning Apparatus and Method Using Adaptive Reconstruction Window," invented by Bernard M. Gordon, et al., U.S. application Ser. No. 08/949,127, filed on Oct. 10, 1997, now U.S. Pat. No. 6,256,404, issued on Jul. 3, 2001;

"Area Detector Array for Computed Tomography Scanning System," invented by David A Schafer, et al., U.S. application Ser. No. 08/948,450, filed on Oct. 10, 1997, now U.S. Pat. No. 6,091,795, issued on Jul. 18, 2000;

"Closed Loop Air Conditioning System for a Computed Tomography Scanner," invented by Eric Bailey, et al., U.S. application Ser. No. 08/948,692, filed on Oct. 10, 1997, now U.S. Pat. No. 5,982,843, issued on Nov. 9, 1999;

"Measurement and Control System for Controlling System Functions as a Function of Rotational Parameters of a Rotating Device," invented by Geoffrey A. Legg, et al., U.S. application Ser. No. 08/948,493, filed on Oct. 10, 1997, now U.S. Pat. No. 5,932,874, issued on Aug. 3, 1999;

"Rotary Energy Shield for Computed Tomography Scanner," invented by Andrew P. Tybinkowski, et al., U.S. application Ser. No. 08/948,698, filed on Oct. 10, 1997, now U.S. Pat. No. 5,937,028, issued on Aug. 10, 1999;

"Apparatus and Method for Detecting Sheet Objects in Computed Tomography Data," invented by Muzaffer Hiraoglu, et al., U.S. application Ser. No. 09/022,189, filed on Feb. 11, 1998, now U.S. Pat. No. 6,111,974, issued on Aug. 29, 2000;

"Apparatus and Method for Eroding Objects in Computed Tomography Data," invented by Sergey Simanovsky, et al., U.S. application Ser. No. 09/021,781, filed on Feb. 11, 1998, now U.S. Pat. No. 6,075,871, issued on Jun. 13, 2000;

"Apparatus and Method for Combining Related Objects in Computed Tomography Data," invented by Ibrahim M. Bechwati, et al., U.S. application Ser. No. 09/022,060, filed on Feb. 11, 1998, now U.S. Pat. No. 6,128,365, issued on Oct. 3, 2000;

"Apparatus and Method for Detecting Sheet Objects in Computed Tomography Data," invented by Sergey Simanovsky, et al., U.S. application Ser. No. 09/022,165, filed on Feb. 11, 1998, now U.S. Pat. No. 6,026,143, issued on Feb. 15, 2000;

"Apparatus and Method for Classifying Objects in Computed Tomography Data Using Density Dependent Mass Thresholds," invented by Ibrahim M. Bechwati, et al., U.S. application Ser. No. 09/021,782, filed on Feb. 11, 1998, now U.S. Pat. No. 6,076,400, issued on Jun. 20, 2000;

"Apparatus and Method for Correcting Object Density in Computed Tomography Data," invented by Ibrahim M. Bechwati, et al., U.S. application Ser. No. 09/022,354, filed on Feb. 11, 1998, now U.S. Pat. No. 6,108,396, issued on Aug. 22, 2000;

"Apparatus and Method for Density Discrimination of Objects in Computed Tomography Data Using Multiple Density Ranges," invented by Sergey Simanovsky, et al., U.S. application Ser. No. 09/021,889, filed on Feb. 11, 1998, now U.S. Pat. No. 6,078,642, issued on Jun. 20, 2000;

"Apparatus and Method for Detection of Liquids in Computed Tomography Data," invented by Muzaffer Hiraoglu, et al., U.S. application Ser. No. 09/022,064, filed on Feb. 11, 1998, now U.S. Pat. No. 6,026,171, issued on Feb. 15, 2000;

"Apparatus and Method for Optimizing Detection of Objects in Computed Tomography Data," invented by Muzaffer Hiraoglu, et al., U.S. application Ser. No. 09/022,062, filed on Feb. 11, 1998, now U.S. Pat. No. 6,272,230, issued on Aug. 7, 2001;

"Multiple-Stage Apparatus and Method for Detecting Objects in Computed Tomography Data," invented by Muzaffer Hiraoglu, et al., U.S. application Ser. No. 09/022,164, filed on Feb. 11, 1998, now U.S. Pat. No. 6,035,014, issued on Mar. 7, 2000;

"Apparatus and Method for Detecting Objects in Computed Tomography Data Using Erosion and Dilation of Objects," invented by Sergey Simanovsky, et al., U.S. application Ser. No. 09/022,204, filed on Feb. 11, 1998, now U.S. Pat. No. 6,067,366, issued on May 23, 2000;

"Apparatus and Method for Classifying Objects in Computed Tomography Data Using Density Dependent Mass Thresholds," invented by Ibrahim M. Bechwati, et al., U.S. application Ser. No. 09/021,782, filed on Feb. 11, 1998, now U.S. Pat. No. 6,076,400, issued on Jun. 20, 2000;

"Apparatus and Method for Detecting Concealed Objects in Computed Tomography Data," invented by Sergey Simanovsky, et al., U.S. application Ser. No. 09/228,380, filed on Jan. 12, 1999, now U.S. Pat. No. 6,195,444, issued on Feb. 27, 2001;

"Apparatus and Method for Optimizing Detection of Objects in Computed Tomography Data," invented by Muzaffer Hiraoglu, et al., U.S. application Ser. No. 09/022,062, filed on Feb. 11, 1998, now U.S. Pat. No. 6,272,230, issued on Aug. 7, 2001;

"Computed Tomography Apparatus and Method for Classifying Objects," invented by Sergey Simanovsky, et al., U.S. application Ser. No. 09/022,059, filed on Feb. 11, 1998, now U.S. Pat. No. 6,317,509, issued on Nov. 23, 2001;

"Apparatus and method for processing object data in computed tomography data using object projections," invented by Carl R. Crawford, et al, U.S. application Ser. No. 09/228,379, filed on Jan. 12, 1999, now U.S. Pat. No. 6,345,113, issued on Feb. 5, 2002;

"Apparatus and method for detecting concealed objects in computed tomography data," invented by Sergey Simanovsky, et al., U.S. application Ser. No. 09/228,380, filed on Jan. 12, 1999, now U.S. Pat. No. 6,195,444, issued on Feb. 27, 2001;

"Method of and system for correcting scatter in a computed tomography scanner," invented by Ibrahim M. Bechwati, et al, U.S. application Ser. No. 10/121,466, filed on Apr. 11, 2002, now U.S. Pat. No. 6,687,326, issued on Feb. 3, 2004;

"Method of and system for reducing metal artifacts in images generated by x-ray scanning devices," invented by Ram Naidu, et al, U.S. application Ser. No. 10/171,116, filed on Jun. 13, 2002, now U.S. Pat. No. 6,721,387, issued on Apr. 13, 2004;

"Method and apparatus for stabilizing the measurement of CT numbers," invented by John M. Dobbs, U.S. application Ser. No. 09/982,192, filed on Oct. 18, 2001, now U.S. Pat. No. 6,748,043, issued on Jun. 8, 2004;

"Method and apparatus for automatic image quality assessment," invented by Seemeen Karimi, et al, U.S. application Ser. No. 09/842,075, filed on Apr. 25, 2001 now U.S. Pat. No. 6,813,374, issued on Nov. 2, 2004;

"Decomposition of Multi-Energy Scan Projections using Multi-Step Fitting," invented by Ram Naidu, et al, U.S. application Ser. No. 10/611,572, filed on Jul. 1, 2003;

"Method of and system for detecting threat objects using computed tomography images," invented by Zhengrong Ying, et al, U.S. application Ser. No. 10/831,909, filed on Apr. 26, 2004;

"Method of and system for computing effective atomic number image in multi-energy computed tomography," invented by Zhengrong Ying, et al, U.S. application Ser. No. 10/850,910, filed on May 21, 2004;

"Method of and system for adaptive scatter correction in multi-energy computed tomography," invented by Zhengrong Ying, et al, U.S. application Ser. No. 10/853,942, filed on May 26, 2004;

"Method of and system for destreaking the photoelectric image in multi-energy computed tomography," invented by Zhengrong Ying, et al, U.S. application Ser. No. 10/860,984, filed on Jun. 4, 2004;

"Method of and system for extracting 3D bag images from continuously reconstructed 2D image slices in computed tomography," invented by Zhengrong Ying, et al, U.S. application Ser. No. 10/864,619, filed on Jun. 9, 2004;

"Method of and system for sharp object detection using computed tomography images," invented by Gregory L. Larson, et. al., U.S. application Ser. No. 10/883,199, filed on Jul. 1, 2004.

"Method of and system for X-ray spectral correction in multi-energy computed tomography," invented by Ram Naidu, et. al., U.S. application Ser. No. 10/899,775, filed on Jul. 17, 2004.

"Method of and system for detecting anomalies in projection images generated by computed tomography scanners," invented by Anton Deykoon, et. al., U.S. application Ser. No. 10/920,635, filed on Aug. 18, 2004.

"Method of and system for stabilizing high voltage power supply voltages in multi-energy computed tomography," invented by Ram Naidu, et. al., U.S. application Ser. No. 10/958,713, filed on Oct. 5, 2004.

FIELD OF THE DISCLOSURE

The present disclosure relates to methods of and systems for processing images generated by multi-energy computed tomography scanners, and more particularly, to a method of and a system for classifying objects using multi-energy computed tomography scanners in a baggage scanning system.

BACKGROUND OF THE DISCLOSURE

Various X-ray baggage scanning systems are known for detecting the presence of explosives and other prohibited items in baggage, or luggage, prior to loading the baggage onto a commercial aircraft. A common technique of measuring a material's density is to expose the material to X-rays and to measure the amount of radiation absorbed by the material, the absorption being indicative of the density. Since many explosive materials may be characterized by a range of densities differentiable from that of other items typically found in baggage, explosives are generally amenable to detection by X-ray equipment.

Most X-ray baggage scanning systems in use today are of the "line scanner" type and include a stationary X-ray source, a stationary linear detector array, and a conveyor belt for transporting baggage between the source and detector array as the baggage passes through the scanner. The X-ray source generates an X-ray beam that passes through and is partially attenuated by the baggage and is then received by the detector array. During each measuring interval the detector array generates data representative of the integral of density of the planar segment of the baggage through which the X-ray beam passes, and this data is used to form one or more raster lines of a two-dimensional image. As the conveyor belt transports the baggage past the stationary source and detector array, the scanner generates a two-dimensional image representative of the density of the baggage, as viewed by the stationary detector array. The density image is typically displayed for analysis by a human operator.

Most explosives capable of significantly damaging an aircraft are sufficiently large in length, width, and height so as to be readily detectable by an X-ray scanner system regardless of the explosive's orientation within the baggage. Plastic explosives, however, present a particular challenge to baggage scanning systems. Due to their moldable nature, plastic explosives may be formed into geometric shapes that are difficult to detect. A plastic explosive powerful enough to damage an aircraft may be formed into a relatively thin sheet that is extremely small in one dimension and is relatively large in the other two dimensions. The detection of plastic explosives may be difficult because it may be difficult to see the explosive material in the image, particularly when the material is disposed so that the thin sheet is parallel to the direction of the X-ray beam as the sheet passes through the system.

Accordingly, a great deal of effort has been made to design a better baggage scanner. Such designs, for example, have been described in U.S. Pat. Nos. 4,759,047 (Donges et al.); 4,884,289 (Glockmann et al.); 5,132,988 (Tsutsui et al.);

5,182,764 (Peschmann et al.); 5,247,561 (Kotowski); 5,319,547 (Krug et al.); 5,367,552 (Peschmann et al.); 5,490,218 (Krug et al.) and German Offenlegungsschrift DE 31 503 06 A1 (Heimann GmbH).

At least one of these designs, described in U.S. Pat. Nos. 5,182,764 (Peschmann et al.) and 5,367,552 (Peschmann et al.) (hereinafter the '764 and '552 patents), has been commercially developed and is referred to hereinafter as the "Invision Machine." The Invision Machine includes a CT scanner of the third generation type, which typically includes an X-ray source and an X-ray detector system secured respectively to diametrically opposite sides of an annular-shaped platform or disk. The disk is rotatably mounted within a gantry support so that in operation the disk continuously rotates about a rotation axis while X-rays pass from the source through an object positioned within the opening of the disk to the detector system.

The detector system can include a linear array of detectors disposed as a single row in the shape of a circular arc having a center of curvature at the focal spot of the X-ray source, i.e., the point within the X-ray source from which the X-rays emanate. The X-ray source generates a fan shaped beam, or fan beam, of X-rays that emanates from the focal spot, passes through a planar imaging field, and is received by the detectors. The CT scanner includes a coordinate system defined by X-, Y- and Z-axes, wherein the axes intersect and are all normal to one another at the center of rotation of the disk as the disk rotates about the rotation axis. This center of rotation is commonly referred to as the "isocenter." The Z-axis is defined by the rotation axis and the X- and Y-axes are defined by and lie within the planar imaging field. The fan beam is thus defined as the volume of space defined between a point source, i.e., the focal spot, and the receiving surfaces of the detectors of the detector array exposed to the X-ray beam. Because the dimension of the receiving surfaces of the linear array of detectors is relatively small in the Z-axis direction the fan beam is designed to be relatively thin in the Z-axis direction. Each detector generates an output signal representative of the intensity of the X-rays incident on that detector. Since the X-rays are partially attenuated by all the mass in their path, the output signal generated by each detector is representative of the density of all the mass disposed in the imaging field between the X-ray source and that detector.

As the disk rotates, the detector array is periodically sampled, and for each measuring interval each of the detectors in the detector array generates an output signal representative of the density of a portion of the object being scanned during that interval. The collection of all of the output signals generated by all the detectors in a single row of the detector array for any measuring interval is referred to as a "projection," or equivalently as a "view," and the angular orientation of the disk (and the corresponding angular orientations of the X-ray source and the detector array) during generation of a projection is referred to as the "projection angle." At each projection angle, the path of the X-rays from the focal spot to each detector, called a "ray," increases in cross section from a point source to the receiving surface area of the detector, and thus is thought to magnify the density measurement because the receiving surface area of the detector area is larger than any cross sectional area of the object through which the ray passes.

As the disk rotates around the object being scanned, the scanner generates a plurality of projections at a corresponding plurality of projection angles. Using well-known algorithms, a CT image of the object may be generated from all the projection data collected at each of the projection angles. The CT image is representative of the density of a two dimensional "slice" of the object through which the fan beam has passed during the rotation of the disk through the various projection angles. The resolution of the CT image is determined in part by the width of the receiving surface area of each detector in the plane of the fan beam, the width of the detector being defined herein as the dimension measured in the same direction as the width of the fan beam, while the length of the detector is defined herein as the dimension measured in a direction normal to the fan beam parallel to the rotation, or Z-axis, of the scanner. In general, the resolution of the CT image is inversely proportional to the width of the receiving surface of each detector in the plane of the fan beam.

The CT scanner should provide images of sufficient resolution to detect plastic explosives on the order of only a few millimeters thick. Therefore, to provide adequate resolution, many revolutions are required. To meet high baggage throughput rates, a conventional CT baggage scanner such as the InVision Machine can only afford to generate a few CT images per bag. Clearly, one cannot scan the entire bag within the time allotted for a reasonably fast throughput. Generating only a few CT images per baggage items leaves most of the item unscanned and therefore does not provide scanning adequate to identify all potential threat objects in the bag, such as sheets of explosive material.

To improve throughput, the InVision Machine uses a pre-screening process which produces a two-dimensional projection image of the entire bag from a single angle. Regions of the projection identified as potentially containing threat items can then be subjected to a full scan or manual inspection. With this pre-screening and selective region scanning approach, the entire bag is not scanned, thus allowing potential threat items to pass through undetected. This is especially true in the case of sheet items oriented transversely to the direction of propagation of the radiation used to form the pre-screen projection and where the sheet covers a relatively large portion of the area of the bag.

Another baggage scanning system is described in an International Patent Application under the Patent Cooperation Treaty, document number WO 96/13017, published on May 2, 1996, entitled, "X-Ray Computed Tomography (CT) System for Detecting Thin Objects," invented by Eberhard, et al. (referred to herein as the "Eberhard et al. system"). In the Eberhard, et al. system, an entire bag is subjected to a CT scan to generate voxel density data for the bag. A connected components labeling (CCL) process is then applied to the entire bag to identify objects by grouping voxels which are physically close together and which have densities within a predetermined range of densities. The voxels in each object are then counted to determine the volume of each object. If the volume of an object exceeds a threshold, the mass of the object is computed by multiplying the volume of each object voxel by its density and then totaling the individual voxel masses. If the mass of an object exceeds a mass threshold, the object is concluded to be a threat.

The Eberhard et al. publication teaches that its system can identify thin objects. The system sets its labeling density at a low level such that thin objects viewed edge-on which partially fill a voxel can be detected.

A significant drawback to the Eberhard et al. system is that it may miss thin objects such as sheet explosives that are not viewed edge-on and which cover a large area of the bag. These transversely oriented sheet objects will add only slightly to the density measured for the bag and will have only small density contrast with the background. If the density threshold used during CCL is set low enough to detect these sheets, then, because of the low contrast between the sheet and the background, the entire bag will be connected and labeled together, and no discernable object will be identified. If the threshold is set higher, then the sheet object will be missed.

Referring to the drawings, FIGS. 1, 2 and 3 show perspective, end cross-sectional and radial cross-sectional views, respectively, of a typical baggage scanning system 100, which includes a conveyor system 110 for continuously conveying baggage or luggage 112 in a direction indicated by arrow 114 through a central aperture of a CT scanning system 120. The conveyor system includes motor driven belts for supporting the baggage. Conveyer system 110 is illustrated as including a plurality of individual conveyor sections 122; however, other forms of conveyor systems may be used.

The CT scanning system 120 includes an annular shaped rotating platform, or disk, 124 disposed within a gantry support 125 for rotation about a rotation axis 127 (shown in FIG. 3) that is preferably parallel to the direction of travel 114 of the baggage 112. Disk 124 is driven about rotation axis 127 by any suitable drive mechanism, such as a belt 116 and motor drive system 118, or other suitable drive mechanism, such as the one described in U.S. Pat. No. 5,473,657 issued Dec. 5, 1995 to Gilbert McKenna, entitled "X-ray Tomographic Scanning System," which is assigned to the present assignee and, which is incorporated herein in its entirety by reference. Rotating platform 124 defines a central aperture 126 through which conveyor system 110 transports the baggage 112.

The system 120 includes an X-ray tube 128 and a detector array 130 which are disposed on diametrically opposite sides of the platform 124. The detector array 130 is preferably a two-dimensional array, such as the array described in U.S. Pat. No. 6,091,795 entitled, "Area Detector Array for Computed Tomography Scanning System." Other suitable arrays are known in the prior art. The system 120 further includes a data acquisition system (DAS) 134 for receiving and processing signals generated by detector array 130, and an X-ray tube control system 136 for supplying power to, and otherwise controlling the operation of, X-ray tube 128. The system 120 is also preferably provided with a computerized system (not shown) for processing the output of the data acquisition system 134 and for generating the necessary signals for operating and controlling the system 120. The computerized system can also include a monitor for displaying information including generated images. System 120 also includes shields 138, which may be fabricated from lead, for example, for preventing radiation from propagating beyond gantry 125.

The X-ray tube 128 may generate a pyramidally shaped beam, often referred to as a "cone beam," 132 of X-rays that pass through a three dimensional imaging field, through which conveying system 110 transports baggage 112. After passing through the baggage disposed in the imaging field, detector array 130 receives cone beam 132 and generates signals representative of the densities of exposed portions of baggage 112. The beam therefore defines a scanning volume of space. Platform 124 rotates about its rotation axis 127, thereby transporting X-ray source 128 and detector array 130 in circular trajectories about baggage 112 as the conveyor system 110 continuously transports baggage through central aperture 126, so as to generate a plurality of projections at a corresponding plurality of projection angles.

Techniques using dual energy X-ray sources are known for providing additional information about a material's characteristics, beyond solely a density measurement. Techniques using dual energy X-ray sources involve measuring the X-ray absorption characteristics of a material for two different energy levels of X-rays. Depending upon the calibration of the scanner, dual energy measurements provide an indication of dual parameters of the material being scanned. For example, at one calibration setting, the dual parameters can be chosen to be the material's effective atomic number (Z is denoted as "effective atomic number") and the material's density. At another calibration setting, the dual parameters can be chosen to be the material's photoelectric coefficients and the material's Compton coefficients. At yet another calibration setting, the dual parameters can be chosen to be an amount of a first material present (e.g., plastic) and an amount of a second material present (e.g., aluminum). Dual energy X-ray techniques for energy-selective reconstruction of X-ray Computer Tomography (hereinafter referred to as CT) images are described, for example, in Robert E. Alvarez and Albert Macovski, "Energy-selective Reconstructions in X-ray Computerized Tomography," Phys. Med. Biol. 1976, Vol. 21, No. 5, 733-744; and U.S. Pat. Nos. 4,029,963 and 5,132,998. One algorithm used to generate such dual parameters from dual energy X-ray projection data is known as the Alvarez/Macovski Algorithm (hereinafter referred to as AMA). Others are known in the art.

One proposed use for such dual energy techniques has been in connection with a baggage scanner for detecting the presence of explosives in baggage. Explosive materials are generally characterized by a known range of atomic numbers and are therefore amenable to detection by such dual energy X-ray sources. One such dual energy source is described in U.S. Pat. No. 5,661,774, entitled "Improved Dual Energy Power Supply," assigned to the present assignee and incorporated herein by reference. When dual energy scanning mode is configured for the system as depicted in FIGS. 1, 2 and 3, the control system 136 supplies modulated high voltages with respect to alternating projection angles to the X-ray tube 128. The detector array 130 then receives data corresponding to high-energy and low-energy X-ray spectra in alternating projection angles. Other dual energy sources are known in the art.

Post-reconstruction analysis and pre-reconstruction analysis are the two prior art techniques generally recognized for using dual energy X-ray sources in materials analysis (e.g., in a baggage scanner for detecting the presence of explosives in baggage). In post-reconstruction analysis, the signal flow is as shown in FIG. 4. The scanner 120 is typically similar to the one shown in FIGS. 1-3 and has an X-ray source capable of producing a fan or cone beam at two distinct energy levels (i.e., dual energy). The DAS 134 gathers signals generated by detector array 130 at discrete angular positions of the rotating platform 124, and passes the signals to the pre-processing unit 206. The pre-processing unit 206 re-sorts the data it receives from the DAS 134 in order to optimize the sequence for the subsequent mathematical processing. The pre-processing unit 206 also corrects the data from the DAS 134 for detector temperature, intensity of the primary beam, gain and offset, and other deterministic errors. Finally, the pre-processing unit 206 extracts data corresponding to high-energy views and routes it to a high-energy path 208, and routes the data corresponding to low-energy views to a low-energy path 210. A first reconstruction computer 218 receives the projection data from the high-energy path 208 and generates a CT image $I_H$ 226 corresponding to the high-energy series of projections. A second reconstruction computer 220 receives the projection data from the low-energy path 210 and generates a CT image $I_L$ 224 corresponding to the low-energy series of projections. A post-processing unit 230 receives the high-energy CT image 226 and the low-energy CT image 224 and performs voxel-by-voxel processing to yield the effective atomic number (Z is denoted as effective atomic number) image $I_z$ 232. The Z image 232 and the high-energy CT image 226 can be provided to operators on a display 240, and both images can be used for automatic explosive detection in 238 as well. The images from the post-reconstruction analysis usually do not yield accurate estimates of the material's effective atomic number, and suffer low SNR (Signal to Noise Ratio) and many artifacts as well.

In pre-reconstruction analysis, the signal flow is as shown in FIG. 5. As is described herein for pre-reconstruction analysis, the dual energy decomposition computer 212 receives the projection data on the high-energy path 208 and the low-energy path 210 and performs the Alvarez/Macovski Algorithm to produce a first stream of projection data $A_c$ 214, which is dependent on a first parameter of the material being scanned, and a second stream of projection data $A_p$ 216, which is dependent on a second parameter of the material scanned. The first material parameter is often the Compton coefficient $a_c$, and the second material parameter is often the photoelectric coefficient $a_p$. A first reconstruction computer 219 receives the first stream of projection data 214 and generates a Compton image $I_c$ 227 from the series of projections corresponding to the first material parameter. A second reconstruction computer 221 receives the second stream of projection data 216 and generates a photoelectric image $I_p$ 225 from the series projections corresponding to the second material parameter. The third reconstruction computer 218 receives the stream of projection data 208 and generates a high-energy CT image $I_H$ 226. The two images 225 and 227 are processed in the post-processing unit 230 to yield a Z image $I_z$ 232. The High-energy CT image 226 and the Z image 232 can be provided to operators on a display 240, and both images can be used for automatic explosive detection in detection unit 238 as well. The pre-reconstruction analysis yields better estimates of material's effective atomic number than the post-reconstruction analysis. However the pre-reconstruction analysis requires one more reconstruction computer than the post-reconstruction analysis.

Various approaches have been used for decomposition of the input projection data $P_L$ and $P_H$ into Compton projections $A_c$ and photoelectric projections $A_p$. For example, the AMA method approximates $P_L$ and $P_H$ using polynomial functions in terms of $A_c$ and $A_p$. The coefficients of the polynomial functions are determined through a calibration procedure as follows. By measuring the projection values of the combination of various thicknesses of two known materials, the coefficients can be calculated through a polynomial least squares fitting between the measured and modeled $P_L$ and $P_H$. Once the coefficients of the polynomial functions are determined, the decomposition of the Compton and Photoelectric projections $A_c$ and $A_p$ from projections $P_L$ and $P_H$ is usually solved using the Newton-Raphson method.

Another prior art method of performing decomposition is the direct approximation method, discussed in L. A. Lehmann, R. E. Alvarez, A. Macovski, W. R. Brody, N. J. Pelc, S. J. Riederer, and A. L. Hall, *Generalized Image Combinations In Dual KVP Digital Radiography*, Med. Phys. 8, 659-667 (1981). In the direct approximation method, $A_c$ and $A_p$ are approximated as polynomial functions in terms of $P_L$ and $P_H$. The coefficients of the polynomial functions in the direct approximation method are determined through a calibration procedure by measuring the projection values of the combination of various thicknesses of two known materials.

In yet another prior art method, decomposition is accomplished using iso-transmission lines, described K. Chuang and H. K. Huang, *A Fast Dual-Energy Computational Method Using Isotransmission Lines and Tables*, Med. Phys. 14, 186-192 (1987). According to this method, for a given projection value, an isotransmission line is represented by a linear equation in two basis functions. The isotransmission line method requires a large amount of calibration data. Further, the isotransmission line becomes increasingly non-linear as the projection value increases. In such a situation, the linear equations are not valid and the method causes large approximation errors.

CT images and Z (effective atomic number) images can be generated from both the pre-reconstruction and post-reconstruction analysis. The CT images measure the CT number of scanned materials, which approximates the density of the materials within each pixel or voxel; and the Z image measures the effective atomic number of the scanned materials within each pixel or voxel. The measurements of both CT number and Z can be used for automatic explosive detection.

In the assignee's single energy CT baggage scanning system as described and claimed in the U.S. patent applications listed above and incorporated herein by reference, single energy CT images without atomic number (Z) images are used to identify and classify threat items such as explosives by analyzing mass and/or density of identified objects in general. Voxels in CT data for a piece of baggage are associated with density values. Voxels having density values within certain predetermined ranges of density value can be identified and grouped together as objects. After objects are thus identified, a discrimination approach is applied in which identified objects can be classified as to whether they pose a threat. Using voxel volumes and masses of identified objects are compared to predetermined mass thresholds. Analysis of this comparison and other predetermined discrimination parameters, such as mean and standard deviation of the density, is used to determine whether the identified object can be classified as a threat object.

With the dual energy CT scanner producing both the CT image and the Z image, it is beneficial to have the detection system to use both types of images for threat detection to reduce false alarm rate, thus lowering the labor cost for checked luggage screening.

The mean and standard deviation of the measured density and atomic number of a segmented object usually do not extract enough information of the object to be classified, thus resulting in a high false alarm rate of the explosive detection system.

Since CT scanners are not perfect imaging devices, they generate artifacts in reconstructed images. For example, when a long cylindrical object is scanned with the long axis in the x-y plane of the scanner coordinate system, there is a severe cupping artifact caused by the beam hardening effect. In such a case, even if the object has uniform density i.e. having a low standard deviation of the physical density, it yields a much higher standard deviation of the density of the object calculated from the CT image. Therefore, one can not tell from the standard deviation of the measured density whether an object has a non-uniform physical density or has a uniform density affected by the beam hardening artifact.

Objects usually comprise parts or portions that are of different densities from each other. For example, a bottle containing liquor as one object at least can be divided into two portions: one portion is the bottle, which is made of glass, and the other portion is the liquid liquor. These two portions are physically very different. They are different in the density, atomic number, uniformity of the density and atomic number as well. A segmentation algorithm usually fails to segment them into two different objects. Sometimes it is actually desirable not to segment them into different objects and is preferred to treat them as a single object for detection. With both the glass bottle and the liquid liquor, it is easier to tell it is a bottle of liquor than with only either one part. However, using the mean and standard deviation of the density and atomic number measurements one can not tell the difference between a bottle containing liquor from a chunk of plastic explosive.

Thus, it is desirable to use other statistics derived from the density and atomic number measurements representing richer information of the segmented object for discriminating threats from non-threats so as to further reduce the false alarm rate.

SUMMARY OF THE DISCLOSURE

The present disclosure is directed to an object identification method, and a computed tomography (CT) baggage scanning system which uses the object identification method of the present disclosure. The object identification method of the disclosure analyzes acquired CT density data and Z (atomic number) data for a region to detect objects in the data.

In one embodiment of the present disclosure, the mean density, the mean atomic number, the standard deviation of the density, the standard deviation of the atomic number, and the mass for each object are computed and used for initial discrimination to generate potential threat objects.

In one embodiment of the present disclosure, local distribution features are computed from the CT images and the Z images for each potential threat object and used to classify threats from non threats. The local density and Z distribution features described in this disclosure provide much richer information about the object; they are first and second order statistics of the local distributions of the density and atomic number measurements of different portions of a segmented object. The local distribution features include local density distribution features and local Z distribution features. The local density distribution features are computed from a local density distribution of the CT image; and the local Z distribution features are computed from a local Z distribution of the Z image. The local density distribution is a magnitude image of the first order derivative of the CT image; and the local Z distribution is a magnitude image of the first order derivative of the Z image. The local density distribution and the local Z distribution provide the information containing the relationship between the neighboring pixels. In computing the local distribution features, each object is also divided into different portions to provide geometrical information for discrimination.

In one embodiment of the present disclosure, the local density and Z distributions are computed using 2D Sobel operators. Other 2D operators can also be used, such as a Prewitt operator, a Canny operator, or a Robberts operator. Also 3D operations can be used for computing the local distributions.

In one embodiment of the present disclosure, during the calculation of the local density and Z distributions, each object is divided into a core portion and a surface portion using 2D three by three neighbors. Alternatively 3D neighbors can also be used. Dividing an object into other different portions can also be used, such as dividing an object into 8 portions corresponding to the 8 octants with the origin at the mass center of the object.

In one embodiment of the present disclosure, histograms of the local density and Z distributions are then computed for each portion of the object. The use of the histograms for computing the local density and Z distribution features eliminates the multiple passes for visiting each pixel for computing the features, thus reducing the computational cost of the feature generation.

In one embodiment of the present disclosure, the local density distribution features include the mean and standard deviation of the local density distribution for the core and surface portions of each object computed from the local density distribution histograms. In an alternative embodiment of the present disclosure, the local Z distribution features include the mean and standard deviation of the local Z distribution for the core and surface portions of each object computed from the local Z distribution histograms. Higher order statistics such as skewness and kurtosis can also be used as features.

In one embodiment of the present disclosure, the local density and Z distributions and the corresponding histograms are computed in a slice by slice fashion. The division of each object into a core portion and a surface portion is also performed in a slice by slice fashion. These computations are performed in the same path.

According to one aspect of the present disclosure, classification is performed using these calculated local density and Z distribution features to discriminate threats from non threats. The parameters used for classification are determined through an empirical analysis of a large number of images of real explosives and actual scans of checked luggage.

A system for classifying objects using local distribution features of multi-energy CT images is also disclosed. The system includes modules configured to implement the above functionality. The system may include a module for computing local distribution features and a module for classifying objects based on local distribution features.

While this disclosure has been particularly shown and described with references to preferred embodiments thereof, it will be understood by those skilled in the art that various changes in form and details may be made therein without departing from the spirit and scope of the disclosure as defined by the following claims.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF THE DRAWINGS

Figure 1:
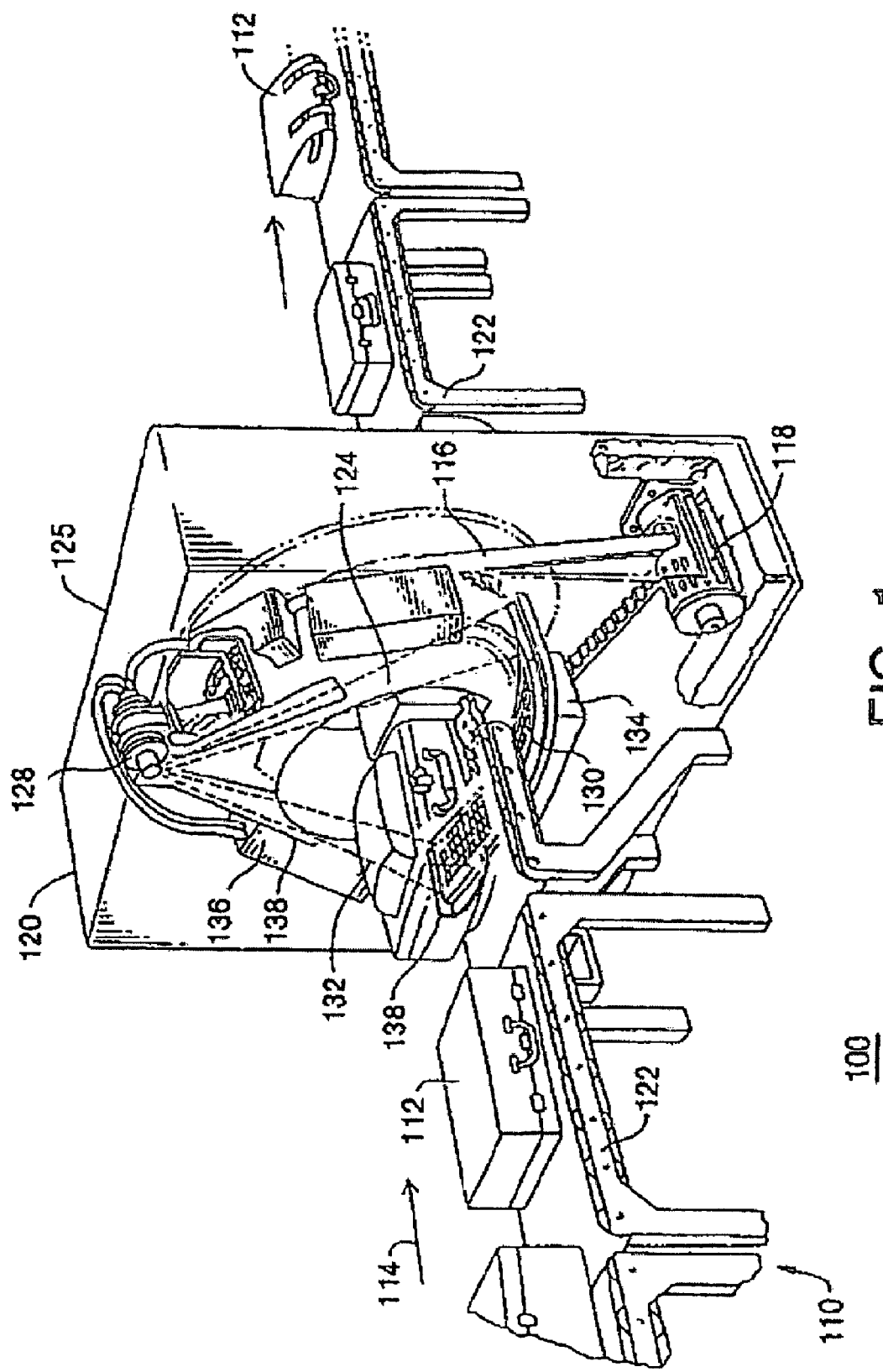
FIG. 1 is a perspective view of a baggage scanning system, known in the prior art.
Figure 2:
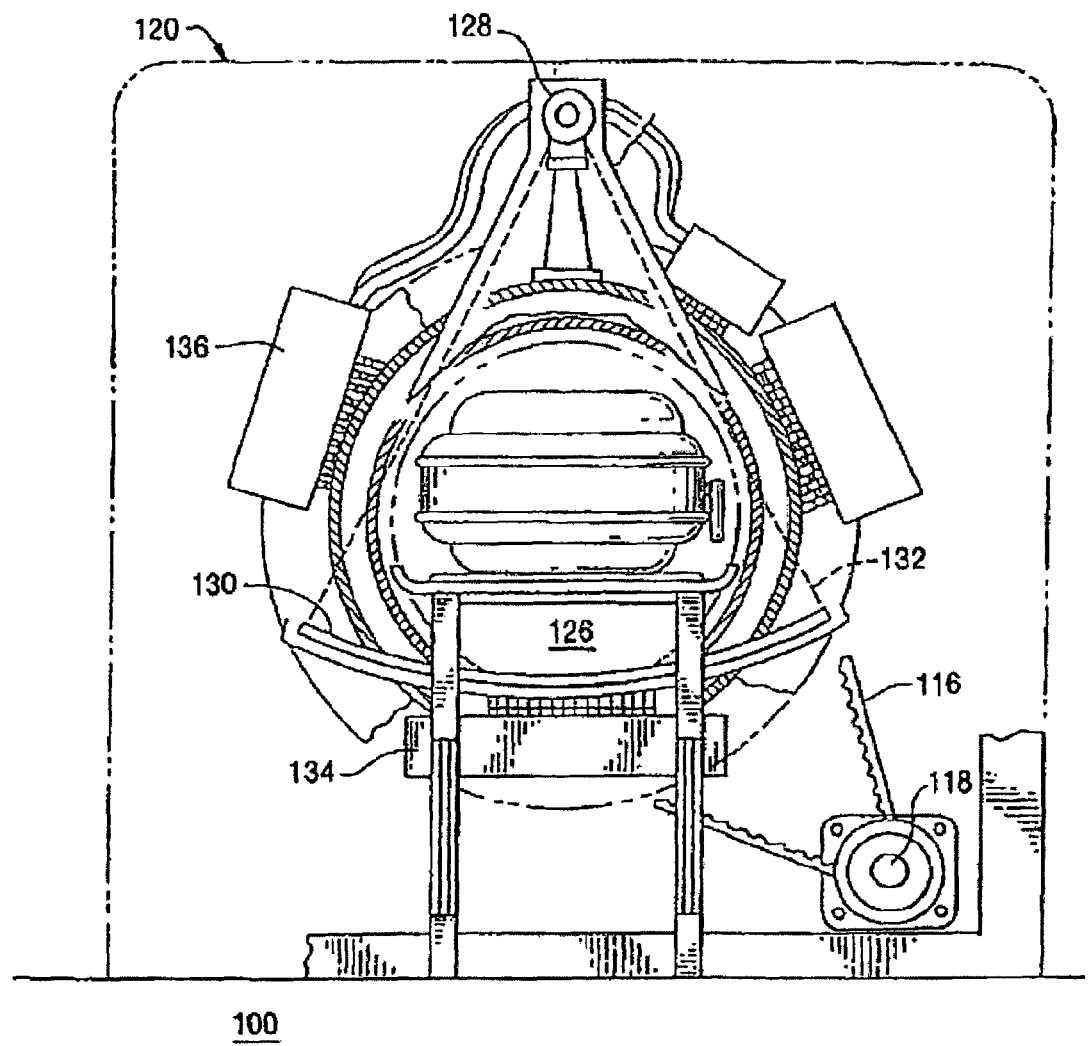
FIG. 2 is a cross-sectional end view of the system of FIG. 1.
Figure 3:
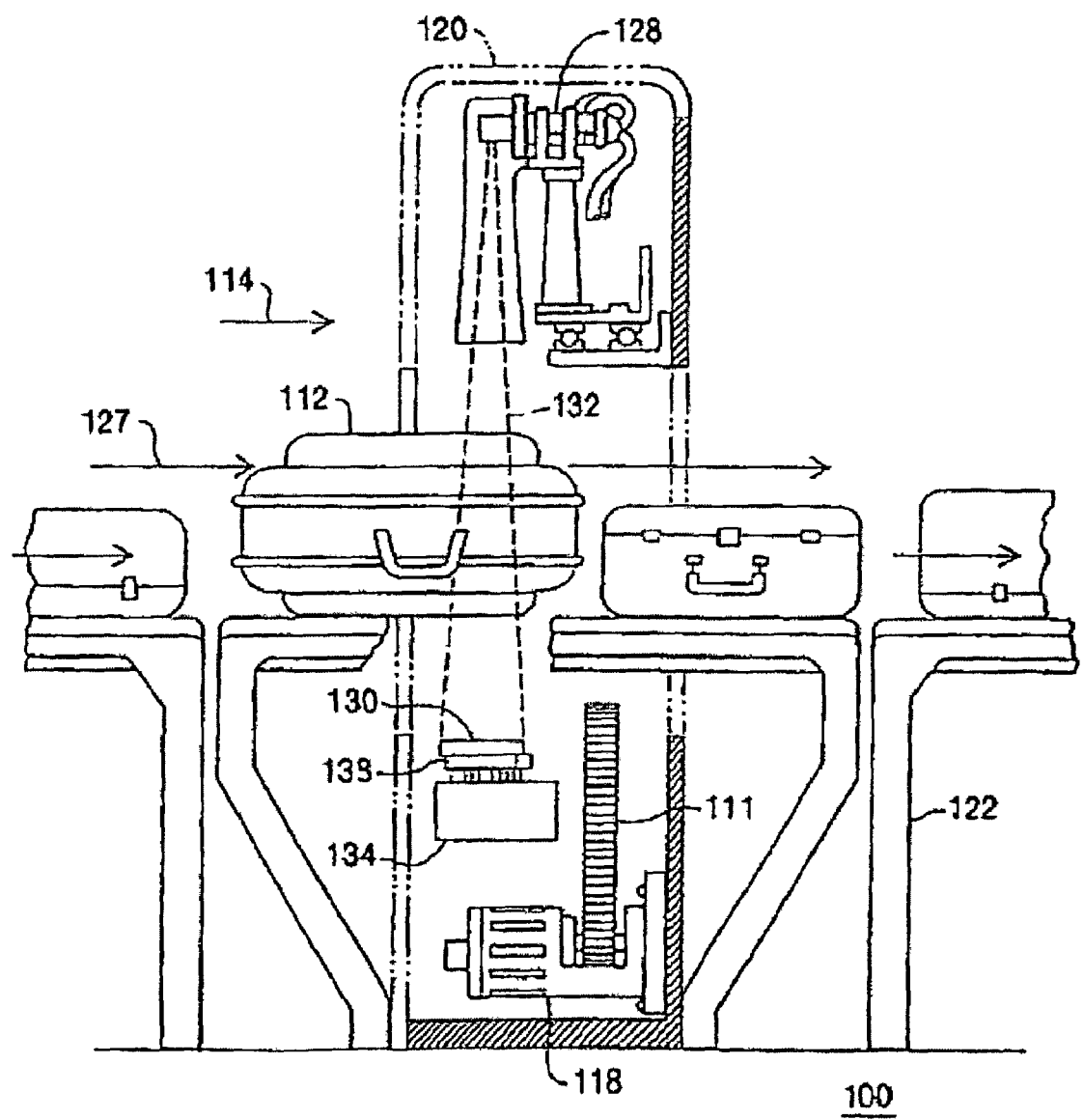
FIG. 3 is a cross-sectional radial view of the system of FIG. 1.
Figure 4:
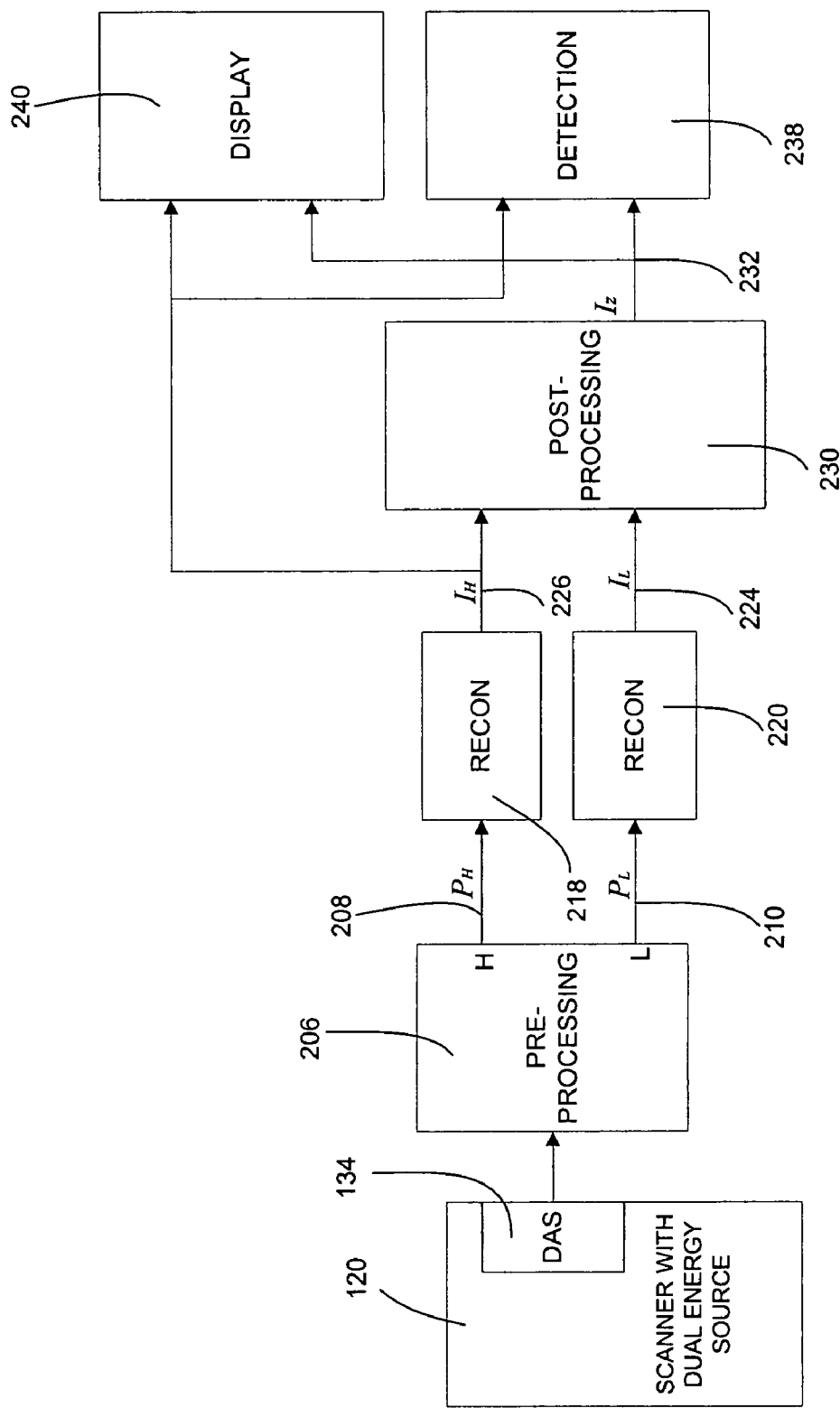
FIG. 4 is a signal flow diagram of a system capable of performing post-reconstruction analysis, useful in the system of FIG. 1.
Figure 5:
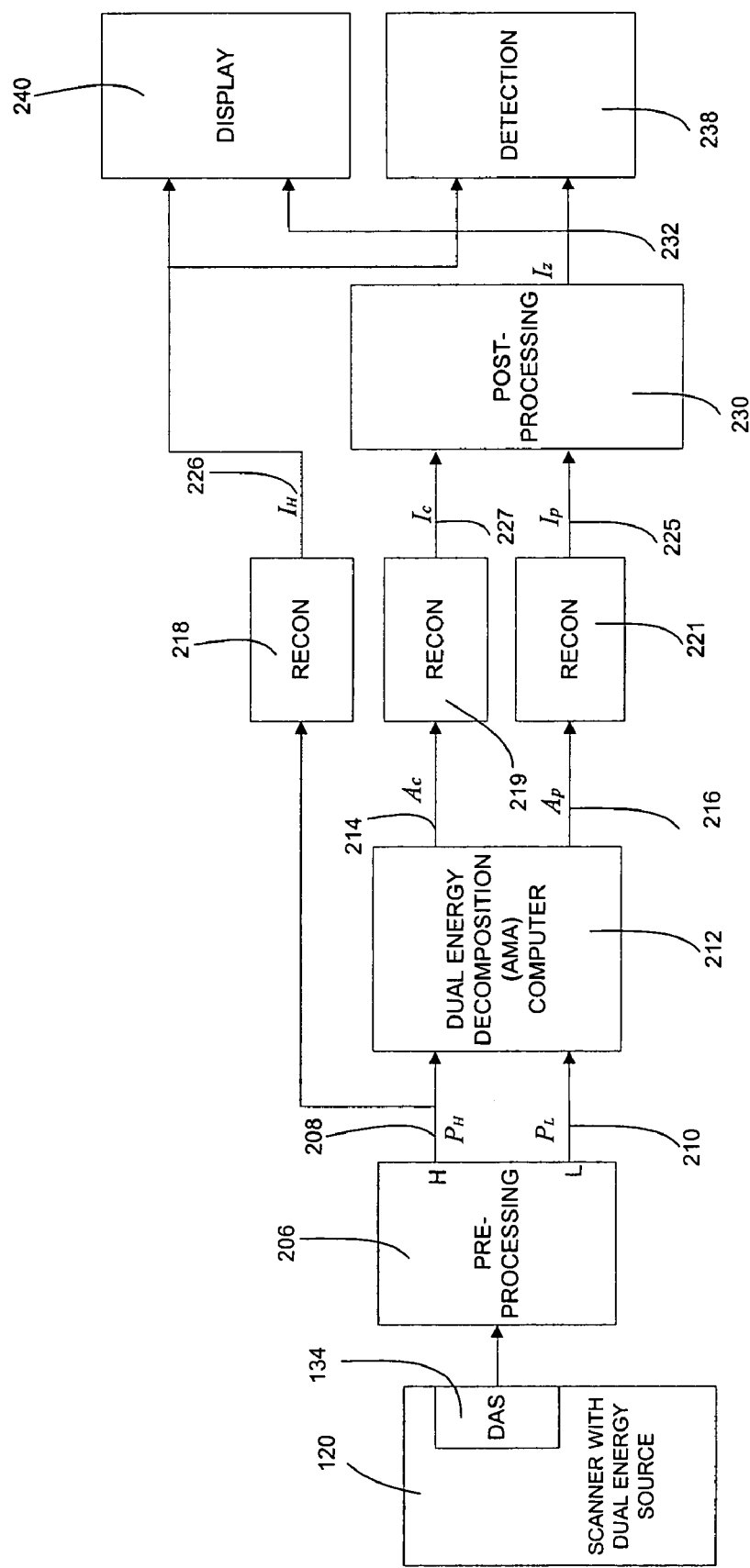
FIG. 5 is a signal flow diagram of a system capable of performing pre-reconstruction analysis, useful in the system of FIG. 1.

The present disclosure provides a system and a method which detect, identify and/or classify objects in multi-energy CT data including a CT image, which approximates the density measurements of the scanned objects, and a Z (effective atomic number) image, which approximates the atomic number measurements of scanned objects. The disclosure can therefore be implemented in a CT baggage scanning system. The objects identified by the disclosure can be objects known to pose threats to persons at an airport or on board an aircraft. These objects can include explosive objects and materials.

One approach to generate the CT image and Z image from a dual energy CT scanner uses methods described in the assignee's "Method of and system for adaptive scatter correction in multi-energy computed tomography" by Zhengrong Ying, et al. U.S. application Ser. No. 10,853,942, filed on May 26, 2004; incorporated herein by reference; "Method of and system for destreaking the photoelectric image in multi-energy computed tomography" by Zhengrong Ying, et. al. U.S. application Ser. No. 10/860,984, filed on Jun. 4, 2004; incorporated herein by reference; "Decomposition of Multi-Energy Scan Projections using Multi-Step Fitting" by Naidu, et. al. U.S. application Ser. No. 10/611,572, filed on Jul. 1, 2003, incorporated herein by reference; "Method of and system for computing effective atomic number image in multi-energy computed tomography" by Zhengrong Ying, et. al. U.S. application Ser. No. 10/850,910, filed on May 21, 2004, incorporated herein by reference; and "Method of and system for X-ray spectral correction in multi-energy computed tomography," by Ram Naidu, et. Al. U.S. application Ser. No. 10/899,775, filed on Jul. 27, 2004, incorporated herein by reference.

NSR (as described in U.S. Pat. No. 5,802,134, incorporated herein its entirety by reference) reconstruction of the dual energy images not only generates a 3D CT image and a 3D Z image for each piece of scanned luggage, but also generates at least two 2D projection images. The 2D projections images are similar to the projection images obtained from line-projection scanners. In one embodiment of the present disclosure, these 2D projection images are used to detect shield objects.

Throughout this application, the term "3-D CT image" and the symbol $C(i,j,k)$ are used to represent a set of CT slice images. The size of each CT slice is I columns by J rows. The symbol i in $C(i,j,k)$ represents the column index and runs from 0 to I−1. Similarly, the symbol j represents the row index and runs from 0 to J−1. There are K of these slices in a set. The symbol k represents one of these slices and runs from 0 to K−1. The function $C(i,j,k)$ is used to refer to or represent a particular CT density in this set, meaning that it is the CT density value at the $i^{th}$ column and the $j^{th}$ row of the $k^{th}$ slice. The CT densities are represented by nonnegative integers with 0 (Hounsfield units) corresponding to the density of air and 1000 (Hounsfield units) corresponding to the density of water, although if desired other integer values can be used.

Similarly, throughout this application, the term "3-D Z image" and the symbol $Z(i,j,k)$ are used to represent a set of Z slice images. The size of a Z image is same as the CT image, that is, I columns by J rows by K slices. The function $Z(i,j,k)$ is used to refer to or represent a particular atomic number in this set, meaning that it is the atomic number value multiplied by 100 at the $i^{th}$ column and the $j^{th}$ row of the $k^{th}$ slice. For example, Aluminum has an atomic number value of 13, and it is 1300 in the Z image.

Figure 6:
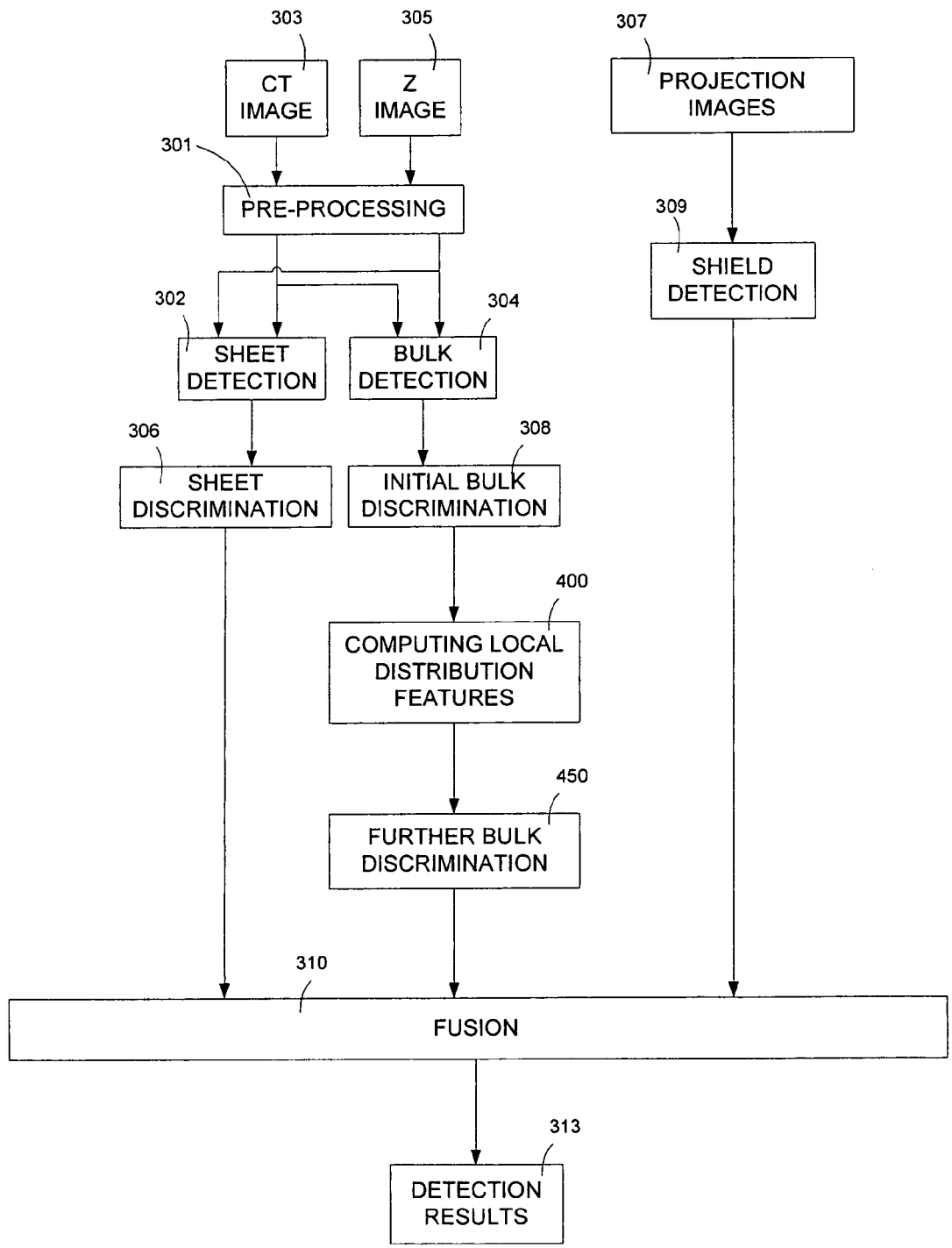
FIG. 6 contains a flow diagram of the logical flow of one embodiment of the object identification method of the present disclosure.

FIG. 6 contains a top-level flow diagram which illustrates the logical flow of one embodiment of the object identification method of the disclosure. In one embodiment, in a first step 301, reconstructed CT image data 303 and Z image data 305 are received and pre-processed. The preprocessing includes finding a Region Of Interest (ROI) from the CT image, and applying the ROI to the Z image. The preprocessing also includes an erosion operation to disconnect thinly connected objects. The methods of finding the ROI and performing the erosion operation are described in the present assignee's patents: U.S. Pat. Nos. 6,076,400, 6,195,444, 6,272,230, 6,317,509, incorporated herein by reference and hereafter referred to as the "Assignee's Patents".

The detection includes two paths: one is a sheet detection path, and the other is a bulk detection path. Along the sheet detection path, sheet-shaped objects are detected in the sheet detection step 302. The sheet detection uses Constant False Alarm Rate (CFAR) and Connected Component Labeling (CCL) methods, which are described in the Assignee's Patents, to segment sheet objects from the CT image. The outputs of sheet explosive detection include a label image for sheet explosives $L_s(i,j,k)$ (same size as $C(i,j,k)$), and the number of detected sheet explosives $N_s$. Each sheet object l=1, ... $N_s$ is defined by a plurality of voxels in $L_s(i,j,k)$ with the label number l.

In the discrimination step 306, detected objects are analyzed to determine if they are threats. The mean density $\rho_l^{sheet}$, the standard deviation of the density $\sigma_l^{\rho sheet}$, the mass $m_l^{sheet}$, the mean atomic number $Z_l^{sheet}$ and the standard deviation of the atomic number $\sigma_l^{Zsheet}$ for each sheet object l=1, ... $N_s$ are all preferably computed for discrimination, $$\rho_l^{sheet} = \frac{1}{N_l} \sum_{L_s(i,j,k)=l} C(i,j,k)$$

$$\sigma_l^{\rho sheet} = \sqrt{\frac{1}{N_l} \sum_{L_s(i,j,k)=l} (C(i,j,k) - \rho_l^{sheet})^2}$$

$$Z_l^{sheet} = \frac{1}{N_l} \sum_{L_s(i,j,k)=l} Z(i,j,k)$$

$$\sigma_l^{Zsheet} = \sqrt{\frac{1}{N_l} \sum_{L_s(i,j,k)=l} (Z(i,j,k) - Z_l^{sheet})^2}$$

where $N_l$ is the number voxels for sheet object l=1, ... $N_s$.

For each sheet object, the decision is made whether this sheet object is a potential threat based on the object mass, the mean and standard deviation of the density and the atomic number. The sheet object is preferably defined as a threat if all of the followings conditions are met:

Mass $m_l^{sheet}$ is greater than a threshold $M_{sheet}$

Mean density $\rho_l^{sheet}$ is within a range $(\rho_{sheet}^{min}, \rho_{sheet}^{max})$ Standard deviation of the density $\sigma_l^{\rho sheet}$ within a range $(\sigma_{sheet}^{\rho min}, \sigma_{sheet}^{\rho max})$ Mean atomic number $Z_l^{sheet}$ is within a range $(Z_{sheet}^{min}, Z_{sheet}^{max})$ Standard deviation of the atomic number $\sigma_l^{Zsheet}$ within a range $(\sigma_{sheet}^{Zmin}, \sigma_{sheet}^{Zmax})$ The parameters $M_{sheet}, (\rho_{sheet}^{min}, \rho_{sheet}^{max}), (\sigma_{sheet}^{\rho min}, \sigma_{sheet}^{\rho max}), (Z_{sheet}^{min}, Z_{sheet}^{max}), (\sigma_{sheet}^{Zmin}, \sigma_{sheet}^{Zmax})$ are empirically or experimentally determined to yield certain detection performance including the probability of detection and probability of false alarm. These parameters can also be dependent on specific types of explosives, and can also be dependent on the mass of the explosive, such as the method described in "Apparatus and method for classifying objects in computed tomography data using density dependent mass thresholds," invented by Ibrahim M. Bechwati, et. al. U.S. Pat. No. 6,076,400, issued on Jun. 20, 2000, incorporated herein by reference, assigned to the present assignee, and hereafter referred toa thte "Bechwati Patent".

The bulk object detection process of the disclosure searches the bag image for clusters of voxels in the density range of interest, and labels them as bulk objects, and can use mass, density, atomic number, and other statistics as features to determine if an object is a threat.

Along the bulk detection path, bulk-type objects are detected in the bulk detection step 304. The bulk detection includes performing CCL, pruning, dilation, partial volume correction, and object merging, which are described in the Assignee's Patents, to segment the CT image into objects. The outputs of bulk detection preferably include a label image for bulk explosives $L_b(i,j,k)$ (same size as $C(i,j,k)$), the number of detected bulk explosives $N_b$, the eroded mean density $\sigma_l^{\rho bulk}$, the standard deviation of the eroded density $\sigma_o^{\rho bulk}$, and the partial volume corrected mass $m_l^{bulk}$. Each bulk object $l=1,\ldots N_b$ is defined by a plurality of voxels in $L_b(i,j,k)$ with the label number l.

In the initial bulk discrimination step 308, detected objects are analyzed to determine if they are potential threats. The mean atomic number $Z_l^{bulk}$ and the standard deviation of the atomic number $\sigma_l^{Zbulk}$ for each bulk object $l=1,\ldots N_b$ are also computed for the initial discrimination, $$Z_l^{bulk} = \frac{1}{N_l} \sum_{L_b(i,j,k)=l} Z(i,j,k)$$

$$\sigma_l^{Zbulk} = \sqrt{\frac{1}{N_l} \sum_{L_b(i,j,k)=l} (Z(i,j,k) - Z_l^{bulk})^2}$$

where $N_l$ is the number voxels for bulk object $l=1,\ldots N_b$.

For each bulk object, the decision is made whether the bulk object is a potential threat based on the object mass, the mean and standard deviation of the density and the atomic number. The bulk object is a potential threat if all of the followings are met:

Mass $m_l^{bulk}$ is greater than a threshold $M_{bulk}$

Mean eroded density $\rho_l^{bulk}$ is within a range ($\rho_{bulk}^{min}$, $\rho_{bulk}^{max}$)

Standard deviation of the eroded density $\sigma_l^{\rho bulk}$ within a range ($\sigma_{bulk}^{\rho min}$, $\sigma_{bulk}^{\rho max}$)

Mean atomic number $Z_l^{bulk}$ is within a range ($Z_{bulk}^{min}$, $Z_{bulk}^{max}$)

Standard deviation of the atomic number $\sigma_l^{Zbulk}$ within a range ($\sigma_{bulk}^{Zmin}$, $\sigma_{bulk}^{Zmax}$)

The parameters $M_{bulk}$, ($\rho_{bulk}^{min}$, $\rho_{bulk}^{max}$), ($\sigma_{bulk}^{\rho min}$, $\sigma_{bulk}^{\rho max}$), ($Z_{bulk}^{min}$, $Z_{bulk}^{max}$), ($\sigma_{bulk}^{Zmin}$, $\sigma_{bulk}^{Zmax}$) are experimentally determined to yield certain detection performance including the probability of detection and probability of false alarm. These parameters can also be dependent on specific types of explosives, and can also be dependent on the mass of the explosive, such as in the method described in the Bechwati Patent.

The initial bulk discrimination step 308 removes some non-threat objects. As mentioned before, the mean and standard deviation of the density and atomic number measurements are not sufficient to represent the segmented objects which have multiple portions with different physical properties.

Since CT scanners are not perfect imaging devices, they generate artifacts in reconstructed images. For example, when a long cylindrical object is scanned with the long axis in the x-y plane of the scanner coordinate system, there is severe cupping artifact caused by the beam hardening effect. In such a case, even if the object has a uniform density i.e. having a low standard deviation of the physical density, but it yields a much higher standard deviation of the density of the object calculated from the CT image. Therefore, the standard deviation of the measured density can not differentiate whether an object has a non-uniform physical density or has a uniform density with the beam hardening artifact.

Objects are usually composed of parts or portions that have different physical properties. For example, a bottle containing liquor as one object can be divided into two portions: one portion is the bottle, which is made of glass, and the other portion is the liquid liquor. These two portions are physically very different. They are different in the density, atomic number, uniformity of the density and atomic number as well. The segmentation algorithm usually fails to segment them into two different objects. Sometime it is actually desirable not to segment them into different objects and to treat them as a single object for detection. For example, with both the glass bottle and the liquid liquor, it is easier to tell it is a bottle of liquor than with only either one part. Using the mean and standard deviation of the density and atomic number measurements one can not tell the difference between a bottle containing liquor from a chunk of plastic explosive.

The local distribution features described in this disclosure provide much richer information about the object; they are first and second order statistics of the local distributions of the density and atomic number measurements of different portions of a segmented object. The local distribution features include local density distribution features and local Z distribution features. The local density distribution features are preferably computed from a local density distribution of the CT image; and the local Z distribution features are preferably computed from a local Z distribution of the Z image. The local density distribution is the magnitude image of the first order derivative of the CT image; the local Z distribution is the magnitude image of the first order derivative of the Z image. The local density distribution and the local Z distribution provide the information containing the relationship between the neighboring pixels. In calculating the local density distribution and local Z distribution, each segmented object is also divided into a core portion and a surface portion to provide geometrical information for discrimination. The details for computing the local distribution features are described below.

In connection to FIG. 6, step 400 computes local distribution features. The inputs include the CT image $C(i,j,k)$, the atomic number image $Z(i,j,k)$, and the label image $L_b(i,j,k)$. The local distributions of the CT image and the Z image are computed using, for example, a Sobel operator, as described in *Two-Dimensional Signal and Image Processing* by J. S. Lim, in a slice by slice fashion. The two-dimensional Sobel operators comprise an x directional operator, denoted as $S_x(i,j)$, and a y directional operator $S_y(i,j)$. They are defined as follows:

$$S_x(i,j) = \frac{1}{8}\begin{bmatrix} -1 & 0 & 1 \\ -2 & 0 & 2 \\ -1 & 0 & 1 \end{bmatrix}$$

$$S_y(i,j) = \frac{1}{8}\begin{bmatrix} -1 & -2 & 1 \\ 0 & 0 & 0 \\ 1 & 2 & 1 \end{bmatrix}$$

For each slice of the CT image $C(i,j,k)$, the local distribution of the CT image $g_\rho(i,j,k)$ is preferably computed as follows:

$$g_\rho(i,j,k) = \sqrt{\rho_x^2(i,j,k) + \rho_y^2(i,j,k)}$$

where $\rho_x(i,j,k)$ and $\rho_y(i,j,k)$ are the convolution results of the CT image $C(i,j,k)$ with Sobel operators $S_x(i,j)$ and $S_y(i,j)$ respectively, $$\rho_x(i,j,k)=C(i,j,k)*S_x(i,j)$$

$$\rho_y(i,j,k)=C(i,j,k)*S_y(i,j)$$

where * is the convolution operator.

Similarly, for each slice of the atomic number image $Z(i,j,k)$, the local distribution of the Z image $g_Z(i,j,k)$ is computed as follows:

$$g_Z(i,j,k)=\sqrt{Z_x^2(i,j,k)+Z_y^2(i,j,k)}.$$

where $Z_x(i,j,k)$ and $Z_y(i,j,k)$ are the convolution results of the atomic number image $Z(i,j,k)$ with Sobel operators $S_x(i,j)$ and $S_y(i,j)$ respectively, $$Z_x(i,j,k)=Z(i,j,k)*S_x(i,j)$$

$$Z_y(i,j,k)=Z(i,j,k)*S_y(i,j)$$

In calculating the local distributions, pixels of each object are also classified into two categories: a surface portion and a core portion. The surface pixels of an object are the ones which have less than 8 neighbors pixels in the same object in the slice, and the core pixels of an object are the ones which have 8 neighbors of the same object in the slice. The pixels of an object which are in the first and the last slice containing the object are also classified as the surface pixels. The classification of the surface and core pixels in computing the local distributions is based on 2D slices, while the classification of the surface and the core voxels in the partial volume correction is based on the whole 3D image.

In one embodiment of the present disclosure, histograms of the local distributions are first calculated; then the local distribution features are computed from these histograms. This implementation avoids more than one visit to each pixel when computing second order or higher statistics of the local distribution features.

Let O be the object of interest, $C_O$ be the core portion of the object, $N_C$ be the number of pixels of the core portion of the object, $S_O$ be the surface portion of the object, and $N_S$ be the number of pixels of the surface portion of the object.

Let $H_\rho^C(n)$ $(n=0, \ldots N_\rho-1)$ be the histogram of the local density distribution of the core portion $C_O$ of the object O, and $H_\rho^S(n)$ $(n=0, \ldots N_\rho-1)$ be the histogram of the local density distribution of the surface portion $S_O$ of the object O. Let $N_\rho$ be the number of bins of the histogram. Let $H_Z^C(n)$ $(n=0, \ldots N_Z-1)$ be the histogram of the local Z distribution of the core portion $C_O$ of an object O, and $H_Z^S(n)$ $(n=0, \ldots N_Z-1)$ be the histogram of the local Z distribution of the surface portion $S_O$ of the object O. Let $N_Z$ be the number of bins of the histogram.

These histograms are calculated when computing the local distributions of the CT image and the Z image slice by slice as follows:

$$H_\rho^C(n) = \frac{1}{N_C} \sum_{L_b(i,j,k) \in C_O} \delta\left(n - \left\lfloor \frac{g_\rho(i,j,k) - g_{\rho his}^{min}}{g_{\rho his}^{bin}} \right\rfloor\right),$$

$$H_\rho^S(n) = \frac{1}{N_S} \sum_{L_b(i,j,k) \in S_O} \delta\left(n - \left\lfloor \frac{g_\rho(i,j,k) - g_{\rho his}^{min}}{g_{\rho his}^{bin}} \right\rfloor\right),$$

$$H_Z^C(n) = \frac{1}{N_C} \sum_{L_b(i,j,k) \in C_O} \delta\left(n - \left\lfloor \frac{g_Z(i,j,k) - g_{Z his}^{min}}{g_{Z his}^{bin}} \right\rfloor\right), \text{ and}$$

$$H_Z^S(n) = \frac{1}{N_S} \sum_{L_b(i,j,k) \in S_O} \delta\left(n - \left\lfloor \frac{g_Z(i,j,k) - g_{Z his}^{min}}{g_{Z his}^{bin}} \right\rfloor\right).$$

where $\lfloor x \rfloor$ is the largest integer no greater than x, $g_{\rho his}^{min}$ is the minimum value of the local density distribution histogram, $g_{\rho his}^{bin}$ is the bin width of the local density distribution histogram, $g_{Z his}^{min}$ is the minimum value of the local Z distribution histogram, $g_{Z his}^{bin}$ is the bin width of the local Z distribution histogram, and $\delta(k)$ is a discrete impulse function as follows:

$$\delta(k) = \begin{cases} 1, & k=0 \\ 0, & \text{otherwise} \end{cases}.$$

The local distribution features include mean and standard deviation of the local density and Z distributions of the core portion and the surface portion of each object. They can be computed as follows. The core local density distribution mean, denoted as $d_\rho^C$, is computed as follows:

$$d_\rho^C = \sum_{n=0}^{N_\rho-1} H_\rho^C(n) \left[ g_{\rho hist}^{min} + \left(n + \frac{1}{2}\right) g_{\rho hist}^{bin} \right].$$

The core local density distribution standard deviation, denoted as $\sigma_\rho^C$, is computed as follows:

$$\sigma_\rho^C = \sqrt{\sum_{n=0}^{N_\rho-1} H_\rho^C(n) \left[ g_{\rho hist}^{min} + \left(n + \frac{1}{2}\right) g_{\rho hist}^{bin} \right]^2 - (d_\rho^C)^2}.$$

The surface local density distribution mean, denoted as $d_\rho^S$, is computed as follows:

$$d_\rho^S = \sum_{n=0}^{N_\rho-1} H_\rho^S(n) \left[ g_{\rho hist}^{min} + \left(n + \frac{1}{2}\right) g_{\rho hist}^{bin} \right].$$

The surface local density distribution standard deviation, denoted as $\sigma_\rho^S$, is computed as follows:

$$\sigma_\rho^S = \sqrt{\sum_{n=0}^{N_\rho-1} H_\rho^S(n) \left[ g_{\rho hist}^{min} + \left(n + \frac{1}{2}\right) g_{\rho hist}^{bin} \right]^2 - (d_\rho^S)^2}.$$

The core local Z distribution mean, denoted as $d_Z^C$, is computed as follows:

$$d_Z^C = \sum_{n=0}^{N_Z-1} H_Z^C(n)\left[g_{Zhist}^{min} + \left(n + \frac{1}{2}\right)g_{Zhist}^{bin}\right].$$

The core local Z distribution standard deviation, denoted as $\sigma_Z^C$, is computed as follows:

$$\sigma_Z^C = \sqrt{\sum_{n=0}^{N_Z-1} H_Z^C(n)\left[g_{Zhist}^{min} + \left(n + \frac{1}{2}\right)g_{Zhist}^{bin}\right]^2 - (d_Z^C)^2}.$$

The surface local Z distribution mean, denoted as $d_\rho^S$, is computed as follows:

$$d_Z^S = \sum_{n=0}^{N_Z-1} H_Z^S(n)\left[g_{Zhist}^{min} + \left(n + \frac{1}{2}\right)g_{Zhist}^{bin}\right].$$

The surface local Z distribution standard deviation, denoted as $\sigma_Z^S$, is computed as follows:

$$\sigma_Z^S = \sqrt{\sum_{n=0}^{N_Z-1} H_Z^S(n)\left[g_{Zhist}^{min} + \left(n + \frac{1}{2}\right)g_{Zhist}^{bin}\right]^2 - (d_Z^S)^2}.$$

In the further discrimination step 450 in connection to FIG. 6, for each potential bulk threat object, the local distribution features are used for further discrimination. The potential bulk threat object is a threat if all of the followings are met:

Core local density distribution mean $d_\rho^C$ within a range $(d_\rho^{Cmin}, d_\rho^{Cmax})$ Surface local density distribution mean $d_\rho^S$ within a range $(d_\rho^{Smin}, d_\rho^{Smax})$ Core local Z distribution mean $d_Z^C$ within a range $(d_Z^{Cmin}, d_Z^{Cmax})$ Surface local Z distribution mean $d_Z^S$ within a range $(d_Z^{Smin}, d_Z^{Smax})$ Core local density distribution standard deviation $\sigma_\rho^C$ within a range $(\sigma_\rho^{Cmin}, \sigma_\rho^{Cmax})$ Surface local density distribution standard deviation $\sigma_\rho^S$ within a range $(\sigma_\rho^{Smin}, \sigma_\rho^{Smax})$ Core local Z distribution standard deviation $\sigma_Z^C$ within a range $(\sigma_Z^{Cmin}, \sigma_Z^{Cmax})$ Surface local Z distribution standard deviation $\sigma_Z^C$ within a range $(\sigma_Z^{Smin}, \sigma_Z^{Smax})$ The parameters $(d_\rho^{Cmin}, d_\rho^{Cmax})$, $(d_\rho^{Smin}, d_\rho^{Smax})$, $(d_Z^{Cmin}, d_Z^{Cmax})$, $(d_Z^{Smin}, d_Z^{Smax})$, $(\sigma_\rho^{Cmin}, \sigma_\rho^{Cmax})$, $(\sigma_\rho^{Smin}, \sigma_\rho^{Smax})$, $(\sigma_Z^{Cmin}, \sigma_Z^{Cmax})$, and $(\sigma_Z^{Smin}, \sigma_Z^{Smax})$ are empirically or experimentally determined to yield certain detection performance including the probability of detection and probability of false alarm. These parameters can also be dependent on a specific type of explosive, and can also be dependent of the mass of explosive, such as the method described in the Bechwati Patent. The discrimination can also be performed in the joint feature space of the above listed features using support vector machines, as described by Christopher J. C. Burges in "A tutorial on support vector machines for pattern recognition," Data Mining and Knowledge Discovery, Volume 2, Issue 2, June 1998, pp. 121-167, incorporated herein by reference, for training to obtain discrimination boundary.

Figure 7:
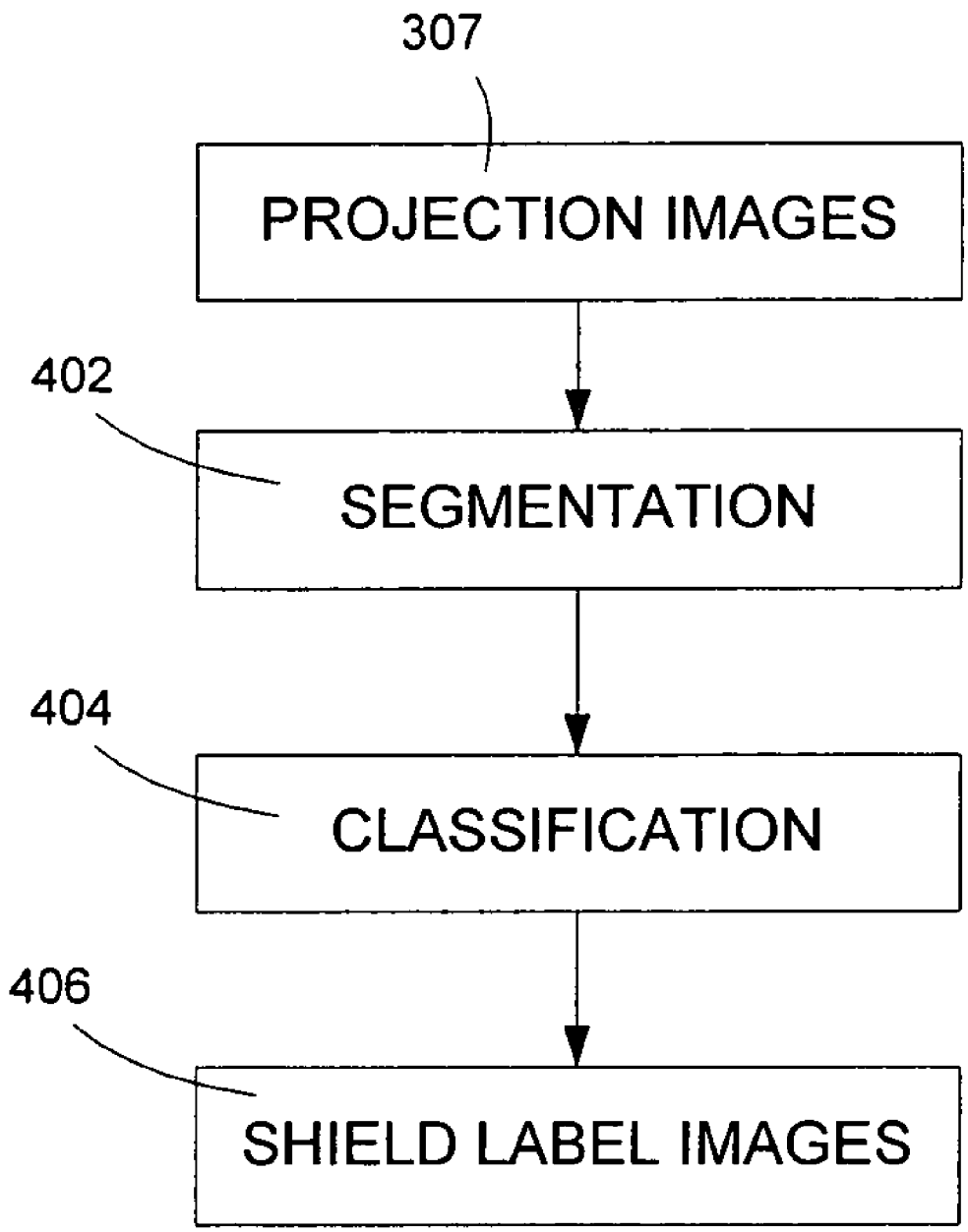
FIG. 7 contains a flow diagram of the logical flow of one embodiment of a shield detection method in accordance with the present disclosure.

The shield detection process of the disclosure preferably searches the projection images for clusters of pixels in the density range of interest, can label them as shield objects. Projection images are 2D images. Each pixel represents the integral of the object x-ray attenuation along the beam path. FIG. 7 is a schematic flow diagram which illustrates the logical flow of one embodiment of the shield detection method of the disclosure. The inputs to the shield detection method include 2D projection images 307. In one particular embodiment of the present disclosure, two projection images, of which the projection angles are 90 degrees apart, are used. Let $P_0(i,j)$ be the first projection image, and $P_1(i,j)$ be the second projection image. The size of both projection images is of I×J pixels.

The segmentation step 402 preferably uses 2D CCL, such as described in A. Rosenfeld and J. L. Pfaltz, "Sequential operations in digital processing," JACM, vol. 13, pp. 471-494, 1966, to segment each of the projection image in the interested attenuation range for shield detection. The resulting label images are denoted as $L_{P0}(i,j)$ and $L_{P1}(i,j)$.

In Step 404 in connection to FIG. 7, the mean attenuation μl and the number of pixels A for each segmented object are computed for classification. A shield is classified if both the mean attenuation μl is greater than an attenuation threshold and the number of pixels A is greater than an area threshold. The thresholds are chosen with lots of analysis of numerous scanned data sets.

Given the bulk, sheet, and shield detection results, the last step, as illustrated in FIG. 6 at step 310, is fusing these results into desired format for operators to interpret.

In one embodiment, the fusion between the bulk label image $L_b(i,j,k)$ and sheet label image $L_s(i,j,k)$ can be performed to yield an output label image $L(i,j,k)$ as follows.

$$L(i,j,k) = L_S(i,j,k)N_b + L_b(i,j,k)$$

where $N_b$ is the number of bulk threats. The output label is essentially a two-dimensional array with sheet label as row index and the bulk label as column index. This allows the voxels occupied by both a bulk threat and a sheet threat to be output for displaying.

While this disclosure has been particularly shown and described with references to preferred embodiments thereof, it will be understood by those skilled in the art that various changes in form and details may be made therein without departing from the spirit and scope of the disclosure as defined by the following claims. Such variations include dividing a segmented object into different and more portions than the core and the surface, computing higher order statistics of the local distribution for each portion of the object as features for discrimination, using different operators in computing the local distributions of the CT and Z images than 2D Sobel operator, and computing local distribution features without using computing the histograms.

The invention claimed is:

1. A method of classifying objects using volumetric multi-energy CT images, wherein a CT image, a Z (atomic number) image and a label image are provided, the method comprising:
   a. Acquiring CT density data for a region of interest (ROI) for detection of a potential threat object within the data using dual energy x-rays, wherein the region includes at least a portion of the inside of a container;

b. Dividing the potential threat object into different geometrical portions using the label image on a slice by slice basis;

c. Computing the local distribution features for each portion of the potential threat object on a slice by slice basis for both volumetric CT images and volumetric atomic number images, wherein computing the local distribution features includes computing local density distribution features of the volumetric CT images and computing local Z (atomic number) distribution features of the volumetric atomic number images; and d. Classifying the potential threat object as a threat or a non-threat using the local distribution features of both the volumetric CT images and volumetric atomic number images.

2. The method of claim 1, wherein computing the local density distribution features includes computing a local density distribution of the CT image.

3. The method of claim 2, wherein computing the local density distribution of the CT image includes using 2D Sobel operators.

4. The method of claim 1, wherein computing the local density distribution features includes computing a local density distribution histogram for each portion of the potential threat object.

5. The method of claim 1, wherein computing the local density distribution features includes computing the mean of the local density distribution for each portion of the potential threat object.

6. The method of claim 5, wherein computing the mean of the local density distribution for each portion of the potential threat object includes using the corresponding local density distribution histogram.

7. The method of claim 1, wherein computing the local density distribution features includes computing the standard deviation of the local density distribution for each portion of the potential threat object.

8. The method of claim 7, wherein computing the standard deviation of the local density distribution for each portion of the potential threat object includes using the corresponding local density distribution histogram.

9. The method of claim 1, wherein computing the local Z distribution features includes computing a local Z (atomic number) distribution of the Z image.

10. The method of claim 9, wherein computing the local Z (atomic number) distribution of the Z (atomic number) image includes using 2D Sobel operators.

11. The method of claim 1, wherein computing the local Z (atomic number) distribution features includes computing a local Z (atomic number) distribution histogram for each portion of the potential threat object.

12. The method of claim 1, wherein computing the local Z (atomic number) distribution features includes computing the mean of the local Z (atomic number) distribution for each portion of the potential threat object.

13. The method of claim 12, wherein computing the mean of the local Z (atomic number) distribution for each portion of the potential threat object includes using the corresponding local Z (atomic number) distribution histogram.

14. The method of claim 1, wherein computing the local Z (atomic number) distribution features includes computing the standard deviation of the local Z (atomic number) distribution for each portion of the potential threat object.

15. The method of claim 14, wherein computing the standard deviation of the local Z (atomic number) distribution for each portion of the potential threat object includes using the corresponding local Z (atomic number) distribution histograms.

16. The method of claim 1, wherein dividing the potential threat object into different geometrical portions includes dividing into a core portion and a surface portion, wherein the core portion includes the pixels of the potential threat object with all their neighboring pixels being of the potential threat object; wherein the surface portion includes the pixels of the potential threat object with one or more their neighboring pixels not being of the potential threat object.

17. The method of claim 16, wherein dividing the potential threat object into the core portion and the surface portion of the potential threat object includes using 2D three by three neighbors.

18. A system for classifying objects using volumetric multi-energy CT images of the objects so as to identify potential threat objects from those that are not potential threats, wherein a CT image, a Z (atomic number) image and a label image of each object are provided, the system comprising:

a. A subsystem arranged and configured to acquire CT density data for a region of interest (ROI) for detection of a potential threat object within the data using dual energy x-rays, wherein the region includes at least a portion of the inside of a container;

b. A first portion arranged and configured so as to divide the object into different geometrical portions on a slice by slice basis;

c. A second portion arranged and configured so as to compute the local distribution features for each portion of the potential threat object on a slice by slice basis for both volumetric CT images and volumetric atomic number images, wherein computing the local distribution features includes computing local density distribution features of the volumetric CT images and computing local Z (atomic number) distribution features of the volumetric atomic number images; and d. A third portion arranged and configured so as to classify the object as a threat or a non-threat using the local distribution features of both the volumetric CT images and volumetric atomic number images.

19. The system of claim 18, wherein the second portion arranged and configured to compute the local distribution features includes a unit arranged and configured to compute local density distribution features.

20. The system of claim 19, wherein the unit arranged and configured to compute the local density distribution features includes a unit arranged and configured to compute local density distribution of the CT image.

21. The system of claim 20, wherein the unit arranged and configured to compute the local density distribution of the CT image includes a unit operator using 2D Sobel operators.

22. The system of claim 19, wherein the unit arranged and configured to compute the local density distribution features includes a unit arranged and configured to compute a local density distribution histogram for each portion of the potential threat object.

23. The system of claim 19, wherein the unit arranged and configured to compute the local density distribution features includes a unit arranged and configured to compute the mean of the local density distribution for each portion of the potential threat object.

24. The system of claim 23, wherein the unit arranged and configured to compute the mean of the local density distribution for each portion of the potential threat object includes using the corresponding local density distribution histogram.

25. The system of claim 19, wherein the unit arranged and configured to compute the local density distribution features includes a unit arranged and configured to compute the standard deviation of the local density distribution for each portion of the potential threat object.

26. The system of claim 25, wherein the unit arranged and configured to compute the standard deviation of the local density distribution for each portion of the potential threat object includes using the corresponding local density distribution histogram.

27. The system of claim 18, wherein the second portion arranged and configured to compute the local distribution features includes a unit arranged and configured to compute local Z (atomic number) distribution features.

28. The system of claim 27, wherein the unit arranged and configured to compute the local Z (atomic number) distribution features includes a unit arranged and configured to compute a local Z (atomic number) distribution of the Z (atomic number) image.

29. The system of claim 28, wherein the unit arranged and configured to compute the local Z (atomic number) distribution of the Z (atomic number) image includes using 2D Sobel operators.

30. The system of claim 27, wherein the unit arranged and configured to compute the local Z (atomic number) distribution features includes a unit arranged and configured to compute a local Z (atomic number) distribution histogram for each portion of the potential threat object.

31. The system of claim 27, wherein the unit arranged and configured to compute the local Z (atomic number) distribution features includes a unit arranged and configured to compute the mean of the local Z (atomic number) distribution for each portion of the potential threat object.

32. The system of claim 31, wherein the unit arranged and configured to compute the mean of the local Z (atomic number) distribution for each portion of the potential threat object includes using the corresponding local Z (atomic number) distribution histogram.

33. The system of claim 27, wherein the unit arranged and configured to compute the local Z (atomic number) distribution features includes a unit arranged and configured to compute the standard deviation of the local Z (atomic number) distribution for each portion of the potential threat object.

34. The system of claim 33, wherein the unit arranged and configured to compute the standard deviation of the local Z (atomic number) distribution for each portion of the potential threat object includes using the corresponding local Z (atomic number) distribution histogram.

35. The method of claim 1, where acquiring CT density data includes searching 2D projection images represented by acquired CT density data for clusters of pixels in a density range of interest.

36. The method of claim 35, further comprising segmenting each of the 2D projection images of the potential threat object for shield detection.

37. The method of claim 36, further comprising computing a mean attenuation $\mu l$ and number of pixels A for each segment of the projection images of the potential threat object.

38. The method of claim 37, further comprising classifying the potential threat object as a shield if both the mean attenuation $\mu l$ is greater than an attenuation threshold and the number of pixels A is greater than a threshold value.

39. The method of claim 36, further comprising choosing an area threshold for classifying a shield.

40. The method of claim 36, further comprising choosing an attenuation threshold for classifying a shield.

41. The method of claim 35, wherein searching 2D projection images comprises searching two projection images, of which the projection images are 90 degrees apart.

42. The method of claim 1, further comprising sheet detection for detecting sheet-shaped objects.

43. The method of claim 42, wherein sheet detection comprises Constant False Alarm Rate (CFAR) and Connected Component Labeling (CCL).

44. The method of claim 42, further comprising sheet discrimination.

45. The method of claim 1, further comprising bulk detection for detecting bulk-type objects.

46. The method of claim 45, wherein bulk detection comprises CCL, pruning, dilation, partial volume correction, and object merging.

47. The method of claim 45, further comprising bulk discrimination.

48. The method of claim 1, wherein classifying the potential threat object as a threat or a non-threat using the local distribution features comprises a classifying threat and non-threat objects as sheet, bulk and shield.

49. The system of claim 18, wherein the system is further configured and arranged to provide fusion of sheet detection, bulk detection, and shield detection.

50. The system of claim 20, wherein the unit arranged and configured to compute the local density distribution of the CT image includes a unit operator using 2D Prewitt operators, 2D Canny Operators, or 2D Robberts operators.

* * * * *